*R. C. Grant,*
*Water Wheel.*
Nº 4125. Patented July 26, 1845.
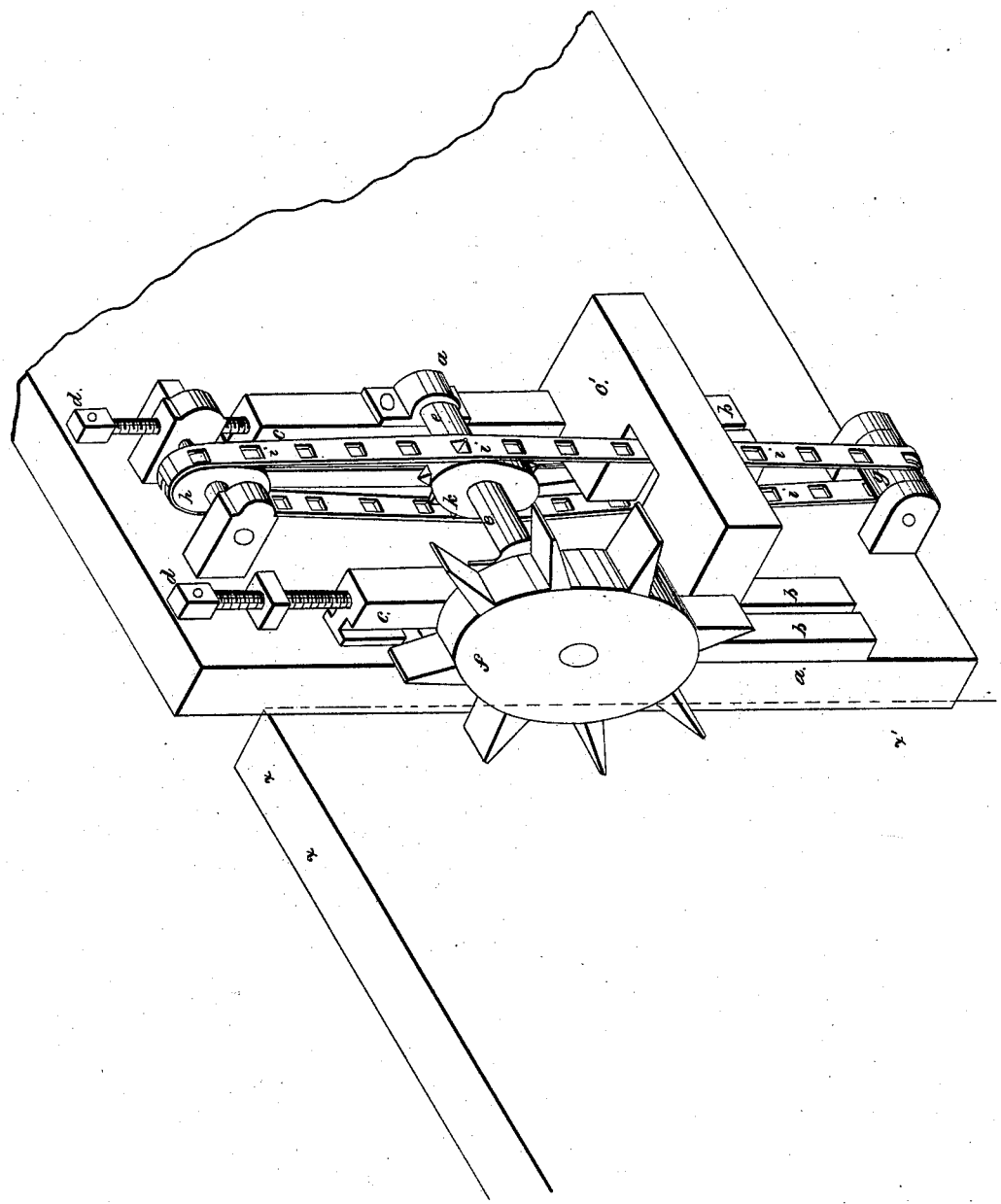

UNITED STATES PATENT OFFICE.

R. C. GRANT, OF POMEROY, OHIO.

TIDE-MILL.

Specification of Letters Patent No. 4,125, dated July 26, 1845.

*To all whom it may concern:*

Be it known that I, ROYAL C. GRANT, of Pomeroy, in the county of Meigs and State of Ohio, have invented a new and useful Improvement in Floating Current or Tide-Water Wheels; and I do hereby declare that the following is a full, clear, and exact description thereof, reference being had to the accompanying drawing, which is an isometrical view of the apparatus.

The nature of my invention consists in hanging a water wheel of ordinary construction in a gate or movable frame that slides up and down in ways attached to the building; a pulley or small wheel being placed below the lowest point of depression and above its highest rise, and connecting them by an endless chain with flat links, in which the cogs of a pinion on the shaft of the wheel works.

In constructing my improvement I build an abutment ($a$) with proper guides ($b$) fixed to it in a vertical position; in these guides or ways ($b$) a gate or oblong frame ($c$) slides which can be raised and lowered by a float ($c'$) attached to it below; or it may be raised by a screw or screws attached above, as represented in red lines ($d$); in the above named frame are the boxes in which the journals of the axle ($e$) of the water wheel turn, this wheel ($f$) is of common construction, and its diameter is proportioned to the work &c., to be done. The gate is made to slide up and down to correspond with the rise and fall of the current or tide, and at a point below its lowest descent, there is placed a pulley or carrying wheel ($g$) running in pedestals affixed to the abutment ($a$); directly over this pulley, and above the highest point to which the shaft rises, is another similar pulley ($h$) and around these there is an endless chain ($i$) made with flat links, into which a spur wheel ($k$) on the shaft of the water wheel works, the cogs taking into the links of the chain on one side only, by this means the chain is kept in constant motion, driving the carrying pulleys above named; to the upper pulley the machinery to be driven is connected—by this arrangement it will be perceived that the wheel will act with the same effect at any height between the two pulleys.

An idler pulley may be made to bear against the outside of the chain if deemed necessary to hold the chain onto the spur wheel. A wing dam may also be erected outside the wheel as shown by the red lines ($x$ $x$) to turn the current to the wheel when the stream is sluggish and another float may be placed outside for another journal bearing to the wheel. I sometimes propose to make the wheel a tight cylinder with the floats projecting from its periphery which makes the wheel itself a float and may dispense with those above described.

What I claim as my invention and desire to secure by Letters Patent is—

The combination of a water wheel, which rises and falls with the current or tide, with an endless chain and pulleys in the manner and for the purpose above specified.

R. C. GRANT.

Witnesses:
J. J. GREENOUGH,
T. C. DONN.